Patented Apr. 1, 1930

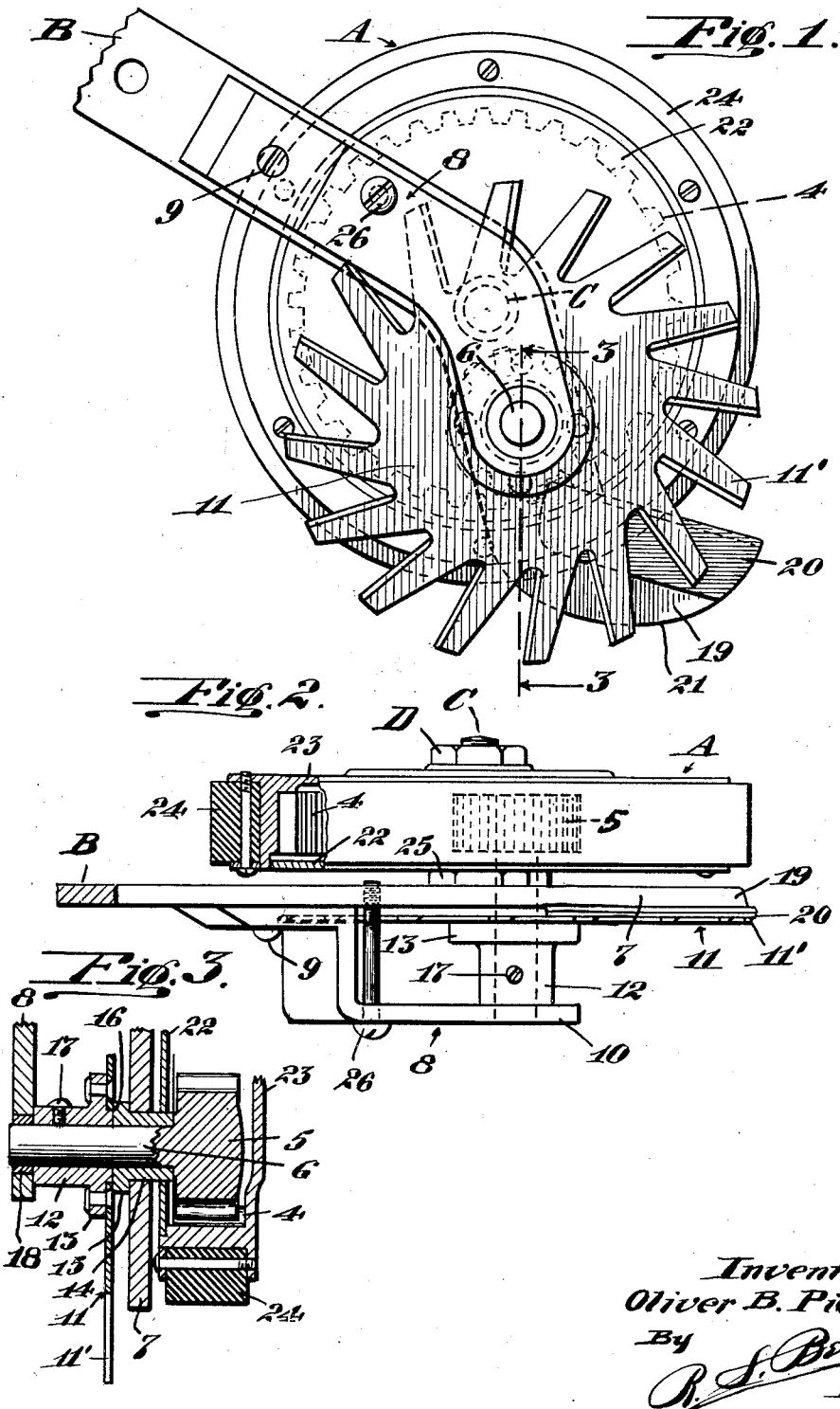

1,752,505

UNITED STATES PATENT OFFICE

OLIVER B. PICKETT, OF LONG BEACH, CALIFORNIA

LAWN EDGER

Application filed June 13, 1927. Serial No. 198,360.

This invention relates to a device for trimming over-hanging grass away from edges of a lawn so as to maintain a neat appearance to the lawn and also to prevent grass from spreading to portions of the yard other than those desired to be occupied by the lawn.

An object of the invention is to provide a lawn edger embodying a rotary cutting blade cooperable with a stationary blade in effecting a cutting action in which the rotary blade is positively driven from a single traction wheel.

Another object is to provide a simple, substantial and economical construction in a lawn edger of the above character, and to produce an arrangement of parts which may be readily assembled.

Another object is to provide improved means for supporting the stationary blade which cooperates with the rotary blade and for maintaining said blade in accurate relation to the rotary blade.

Other objects of the invention are to, in general, simplify the construction of devices of this kind, to render them more durable, less expensive to construct and also less apt to get out of order.

Other objects and advantages may appear hereinafter.

The accompanying drawings illustrate a preferred form of the invention. Referring thereto:

Fig. 1 is a side elevation of the appliance, a portion of the operating handle being broken away to contract the view;

Fig. 2 is a plan view, a portion of the periphery of the ground or traction wheel being shown in section;

Fig. 3 is a fragmental sectional view as seen on line 3—3 of Fig. 1.

Referring in detail to the drawings, a traction wheel A is rotatably mounted on a handle member B by means of a stud or shaft C and retaining nut D. Said handle B consists of a strap of metal adapted to be secured to the handle proper (not shown). Said traction wheel is provided with internal gear teeth 4 with which meshes a toothed pinion 5 on a shaft 6. In order to revolubly support said pinion 5 in proper relation to the teeth 4 of the traction wheel, the handle member B is provided with an extension 7 which projects below the axis of said traction wheel, and a cooperating bracket 8 is attached by screw 9 or other fastenings to said handle and having an offset portion 10 which extends downward by said extension in spaced relation thereto, and the shaft 6 carrying the pinion gear 5 is supported between said bracket and extension. A toothed cutting disk 11 having teeth 11' is fixed to said shaft 6 by means of a collar 12 having a flange portion 13 to which said cutting disk is riveted or otherwise secured. Between said collar 12 and pinion gear 5 is a bushing 14 having a flange portion 15 which fits snugly in between the handle extension 7 and the cutting disk 11. Said cutting disk is provided with a circular aperture at its center, of greater diameter than the diameter of the shaft 6 whereby it is fitted over an end extension or annular shoulder 16 of the collar 12; said aperture however being small enough to permit the flange 15 to abut against the side thereof as clearly shown in Fig. 3. The collar 12 is fixedly secured to the shaft 6 by a set screw 17, and the outer end of the shaft is journalled in a bushing 18 carried by the bracket 8.

A foot piece 19 which forms a downward continuation of the handle extension 7, carries a fixed cutting blade 20 which cooperates with the cutting teeth of the revoluble disk. This foot piece 19 is provided with a convex base portion 21 so that it will readily slide over the ground.

The traction wheel A has a removable inner side plate 22 and a fixed outer side wall 23 and is desirably provided with a rubber tread 24.

The stub shaft C on which the traction A is mounted projects laterally from one side of the bifurcated member that is formed by the handle member B and its bracket 8. A spacing nut 25 is screwed onto said shaft to properly space the traction wheel away from the side of the handle member. To the outer end of said shaft C is screwed the securing nut D. By the construction set forth, the shaft 6 is secured in place in a very firm and stable manner between the two branches of the bifurcated handle member.

In assembling the parts, the end of pinion gear shaft 6 is first inserted through the handle extension 7, then the bushing 15 is interplaced and the collar 12 with the cutting disk attached thereto is placed in position over the end of the pinion shaft and said shaft is fully inserted. Lastly the bracket 8 is placed over the end of said shaft and secured in place on the handle member.

As a means for effecting adjustment of the rotary cutting disk relatively to the fixed blade so as to insure proper shearing action of the teeth as they pass the upper or cutting edge of the blade, an adjusting screw 26 is passed through an opening in the bracket and is screwed into engagement with the member B so that by tightening the screw with its head seating on the bracket the latter will be drawn inwardly and be thereby caused to bear against the outer end of the hub 12 and thus act to press the cutting disk snugly against the outer face of the fixed blade.

In operation, the traction wheel is caused to travel along the edge of the walk which is adjacent to the lawn thereby effecting rotation of the cutting disk through the medium of gear teeth 4, pinion 5 and shaft 6; the cutting disk thereby being brought into position and actuated to trim away overhanging grass from the lawn edge, and the grass being severed by the shearing action of the teeth 11' on the revolving cutter disk cooperating with the fixed blade 20. By raising or depressing the handle member the operator can regulate the depth of cut that will be made by the rotary disk.

While I have shown and described a specific embodiment of my invention, various changes and modifications may be made in the device without departing from the invention as set forth in the appended claims.

I claim:

1. In a lawn edger, in combination, a traction wheel having internal gear teeth, a handle member on which said wheel is rotatably mounted, said handle member having an extension which projects below the axis of rotation of said wheel, a pinion shaft mounted in said extension, a pinion gear fixed to one end of said shaft and meshing with said internal gear teeth, a toothed cutting disk fixed to the other end of said pinion shaft, a foot-piece formed as a downward continuation of said extension of the handle member, a cutting blade carried by said foot-piece to cooperate with the teeth of said cutting disk, a screw on said handle member, and means engaged by said screw connected to said pinion shaft operable to vary the pressure of the cutting disk against said cutting blade.

2. In a lawn edger, the combination, of a handle member, a traction wheel mounted thereon, said wheel having internal gear teeth; a stub shaft fixed to said handle member whereon said wheel is mounted at one side of said handle member, a bracket secured to the opposite side of said handle member, a pinion shaft, a pinion gear at one end of said pinion shaft in fixed relation thereto, the teeth thereof meshing with the teeth of said internal gear, said pinion shaft being revolubly supported between said bracket and handle member, a collar on said shaft between said bracket and handle member, said collar having a peripheral flange around the end thereof nearest the handle member, a cutting disk having a central aperture fitting over said shaft and over an annular shoulder with which said collar is provided, said cutting disk being fixed to said peripheral flange, a spacing bushing fitting within said handle member, one end of said bushing abutting against said blade and the other end thereof abutting against said pinion, and a fixed cutting blade mounted on an extension of said handle, adapted to cooperate with said cutting disk to effect cutting thereby.

3. In a lawn edger, a bifurcated handle member, a traction wheel carried by said member external to the bifurcation thereof, a shaft revolubly mounted within said bifurcation, a toothed pinion carried by said shaft in operable relation to said traction wheel, a rotary cutting disk between the branches of said bifurcated member, a collar mounted on said shaft to rotate therewith, said disk being fixed to one end of said collar, a bushing extending through one arm of said bifurcated member, said bushing having at one end a peripheral flange which fits between the inner side of one of said bifurcations and the face of said rotary disk, and a fixed cutting blade mounted upon one branch of said bifurcation, adapted to effect a cutting action with said rotating cutting disk.

4. In a lawn edger, a bifurcated handle member having aligned bearing apertures in the branches thereof, a shaft mounted revolubly within said apertures, a collar fixed to said shaft between said branches, a cutting disk secured to said collar, a toothed pinion in fixed relation to said shaft, one end of said shaft extending outside of the bifurcated portion of said handle member in order to support said pinion, a bushing around said shaft and filling up the space between said pinion and collar, a traction wheel to operate said pinion, and a fixed cutting blade mounted upon one branch of said bifurcation adapted to effect a cutting action upon rotation of said cutting disk.

5. In a lawn edger, a bifurcated handle member, a traction wheel carried by said member external to the bifurcation thereof, a shaft revolubly mounted within said bifurcation, a toothed pinion carried by said shaft in operable relation to said traction wheel, a rotary cutting disk between the branches of said bifurcated member, a fixed blade on the bifurcated member against which the cutting disk bears, a collar mounted on said shaft to rotate therewith, said disk being fixed to one end of said collar, and a bushing extending through one arm of said bifurcated member, said bushing having at one end a peripheral flange which fits between the inner side of one of said bifurcations and the face of said rotary disk, and a screw extending across the bifurcated handle member operable to vary the pressure of the cutting disk against the fixed blade.

In testimony whereof, I have affixed my signature.

OLIVER B. PICKETT.